United States Patent
Schröder

[11] 3,915,122
[45] Oct. 28, 1975

[54] STEAM GENERATOR FOR A PRESSURIZED-WATER COOLANT NUCLEAR REACTOR

[75] Inventor: Heinz-Jürgen Schröder, Erlangen, Germany

[73] Assignee: Siemens Aktiengesellschaft, Munich, Germany

[22] Filed: Dec. 14, 1973

[21] Appl. No.: 424,689

[30] Foreign Application Priority Data
Dec. 19, 1972 Germany............................ 2262151

[52] U.S. Cl. .................. 122/32; 122/381; 122/382
[51] Int. Cl............................................. F22b 37/54
[58] Field of Search ........ 122/32, 34, 379, 381, 382

[56] References Cited
UNITED STATES PATENTS

| | | | |
|---|---|---|---|
| 3,074,216 | 1/1963 | Loebel............................ | 122/382 X |
| 3,139,070 | 6/1964 | Sprague et al....................... | 122/34 |
| 3,483,848 | 12/1969 | Green................................ | 122/32 |

Primary Examiner—Kenneth W. Sprague
Attorney, Agent, or Firm—Kenyon & Kenyon Reilly Carr & Chapin

[57] ABSTRACT

A steam generator for a pressurized-water coolant nuclear reactor is of the type having a vertical housing with its lower portion closed by a horizontal tube sheet in which the inlet and outlet legs of an inverted U-shaped tube bundle are mounted, one forming an inlet leg and the other forming an outlet leg for the pressurized-water coolant circulated via the tube bundle and the reactor. The tube bundle is peripherally enclosed by a vertical shell forming a feed-water descent space between it and the housing with this space adjacently above the tube sheet peripherally opening to the latter for radially inwardly directed feed-water flow thereover through the interspaced tubes of the tube bundle legs and upward flow through the latter to generate steam in the housing. The feed-water flow over the tube sheet and through the tubes of the inlet leg, which is the hotter of the two legs, tends to locally boil so that corrosion-promoting products in the feed water are concentrated to form deposits introducing the danger of corrosion failure on the part of the tubes and/or tube sheet. To prevent this, means are provided for removing a portion of the feed water from adjacently above the tube sheet and between the interspaced tubes of the inlet leg, the means preferably removing a plurality of flows of feed water from a plurality of positions interspaced transversely over the tube sheet. The constant removal of the flows of feedwater increases the rate with which the feed water radially flows inwardly over the tube sheet and upwardly through the tube bundle, consequently reducing or eliminating the boiling tendency throughout the critical area where this tendency occurs over the portion of the tube sheet in which the inlet leg of the tube bundle is mounted.

5 Claims, 3 Drawing Figures 3,915,122

STEAM GENERATOR FOR A PRESSURIZED-WATER COOLANT NUCLEAR REACTOR

BACKGROUND OF THE INVENTION

This invention relates to steam generators for a pressurized-water coolant nuclear reactor. Such a steam generator typically has a vertical housing, a horizontal tube sheet closing the lower end of the housing, a heat exchanger tube bundle having inlet and outlet legs mounted in the tube sheet with each leg formed by a plurality of closely interspaced vertical tubes. The inlet and outlet legs interconnect via rounded return portions. Below the tube sheet an inlet manifold connected with a pressurized-water coolant outlet of the nuclear reactor, causes this inlet leg to receive an inlet flow of pressurized-water reactor coolant, the outlet leg of the tube bundle being connected by an outlet manifold below the tube bundle, with a coolant inlet of the reactor via a circulating pump.

The housing of the steam generator has means for feeding feed-water into it above the tube sheet for conversion to steam, the housing having a steam dome and a steam outlet. For vertical circulation of the feed-water in the housing, a vertical shell peripherally encloses the tube bundle and forms a feed-water descent space between it and the housing, with this space adjacently above the tube sheet peripherally opening to the latter for radially inwardly directed feed-water flow thereover through the interspaced tubes of the legs and upward flow through the tube bundle to generate steam in the housing.

The heating feed-water ascends within the vertical shell, flows over the top of the shell and downwardly through the descent space, then flowing radially inwardly through the tube sheet to again ascend. While ascending, the feed-water evaporates to generate the steam.

The radially inwardly directed flow of water over the tube sheet portion in which the inlet leg of the tube bundle is mounted, encounters the maximum amount of heat of necessity. This area presents the problem that if the flow rate of the feed-water cannot be maintained high enough in this area, the feed-water boils instead of remaining as solid water free from bubbles of steam. The feed-water inevitably contains unavoidably a certain content of products which are corrosive to the metal from which the tube sheet and the tube bundle are made. With such boiling these products are gradually concentrated and deposited on the tube sheet and the adjacent portions of the tubes of the inlet tube leg, introducing the problem of corrosion damage to these parts. Considering the expense involved by the repair and/or reconstruction of such a steam generator, this problem requires serious attention in the direction of a solution.

SUMMARY OF THE INVENTION

One of the objects of the present invention is to provide such a solution.

The solution of the present invention comprises a means for removing a portion of the feed-water from adjacently above the tube sheet and between the interspaced tubes of the inlet leg, such removal being preferably by removing a plurality of flows of feed-water from a plurality of positions interspaced transversely over the tube sheet. By removing the flows of feed-water throughout the critical area, the flow rate of the radially inwardly directed flow of feed-water is substantially increased throughout this area over the tube sheet and between the tubes of the inlet leg of the tube bundle. It is understood that the amount of feed-water removed throughout this area is small relative to the amount of feed-water that flows over this area from the bottom of the generator's descent space for upward flow through the tube bundle including the inlet leg of the latter, the removed flow accelerating the flow rate of the radially inwardly directed flow which proceeds to ascend upwardly through the tube bundle and at the latter's top where the peripherally enclosing shell terminates, over the latter and downwardly through the descent space as a continuously circulating flow.

The means of the invention specifically comprises a plurality of pipes extending through the generator's housing and which are vertically stacked one above another to compact the horizontal dimensions of the group of pipes to the maximum degree. The bottom pipe is horizontal throughout with a bottom forming an inlet close to the tube sheet. This bottom pipe terminates closest to the periphery of the tube sheet, the next upward pipe having a horizontal portion for the length of this bottom pipe and therebeyond deflecting downwardly to an end portion located inwardly beyond the end portion of the bottom pipe and then having a horizontally extending portion forming an inlet which is also close to the tube sheet. This arrangement proceeds for the successively next upward pipes for the height of the entire stack of pipes. All of the pipes, including their downwardly deflecting portions, are parallel to each other and have extended horizontal bottom walls each of which is very closely spaced to the top of the horizontal tube sheet. These horizontal portions close to the tube sheet are each provided with a slot or a row of openings into which the feed-water can flow. The stack of pipes may be connected as blowdown pipes.

The removal of the feed-water by the successively inwardly extending portions of the stack of pipes, provides for the previously described flow rate increase on the part of the usual radially inward flow of feed-water. The effect is that of substantially decreasing the flow resistance normally presented to the radial inward flow of feed-water, this reduction being obtained by the fact that more feed-water is removed from the critical region than can possibly result because of the ascending flow of feed-water within the shell peripherally enclosing the tube bundle. This, in turn, permits an increase in the ascending flow of feed-water through the tube bundle itself, causing a stronger flow and better mixing of the ascending feed-water. Both effects reduce the tendency for the feed-water to boil and throw down undesirable deposits within the hottest area above the tube sheet and within the inlet leg of the tube bundle.

Although the stack of pipes has the minimum possible transverse horizontal dimension, the tubes of the inlet leg of the tube bundle are normally interspaced too closely to provide clearance for the pipes. Therefore, the tubes of the inlet leg are interspaced to form a horizontally extending path through the tubes of the inlet leg and in which the stack of pipes is positioned. In effect, an alleyway or pathway is formed by appropriately interspacing the inlet leg tubes. To permit this, the tube bundle legs may be asymmetrically positioned as contrasted to the usual symmetric arrangement about the vertical plane between the two tube bottom legs. In other words, the leg where the pathway is formed and which contains the stack of tubes, this being the inlet leg, must be physically fatter in the horizontal direction than the outlet leg where the tubes may be interspaced in the more customary manner and, therefore, providing greater compactness in the horizontal direction. Such an asymmetrical arrangement does not interfere with the efficiency of the steam generator.

The bottom of the shell peripherally enclosing the tube bundle has its bottom spaced above the tube sheet to provide for the radial inward flow of feed-water descending through the descent space. Advantage is taken of this to mount a horizontal strip for supporting the stack of tubes. This strip is fastened to the bottom portion of the shell so as to extend through the alleyway or passageway provided to form clearance for the stack of tubes. Rods extend downwardly from this plate to the tops of the various tubes so that by interfastening the tubes together the entire stack is suspended with its inlet portions for removing the feed-water, spaced very closely to the top of the tube sheet. This strip may be formed with a longitudinally elongated cutout or opening above the middle portion of the critical area above the tube sheet so as not to interfere with the ascending flow of feed-water, but the portions of the strip more adjacent to the peripheral portions of this area may be kept solid. The solid strip portion beyond the inward terminating end of the stack of tubes may be provided with openings for passing any tubes of the inlet leg located in that area. In other words, the mounting strip for the stack of tubes has a more or less centralized opening. With this arrangement there is a further acceleration of the radially inward and then upward flow of the feed-water throughout this critical area, while at the same time structure is provided for mounting the stack of tubes with the lower wall of each tube of the stack spaced slightly above the top of the tube sheet but free from contact with the latter.

BRIEF DESCRIPTION OF THE DRAWING

A specific example of the invention is schematically illustrated by the accompanying drawing, in which.

DETAILED DESCRIPTION OF THE INVENTION

Figure 1:
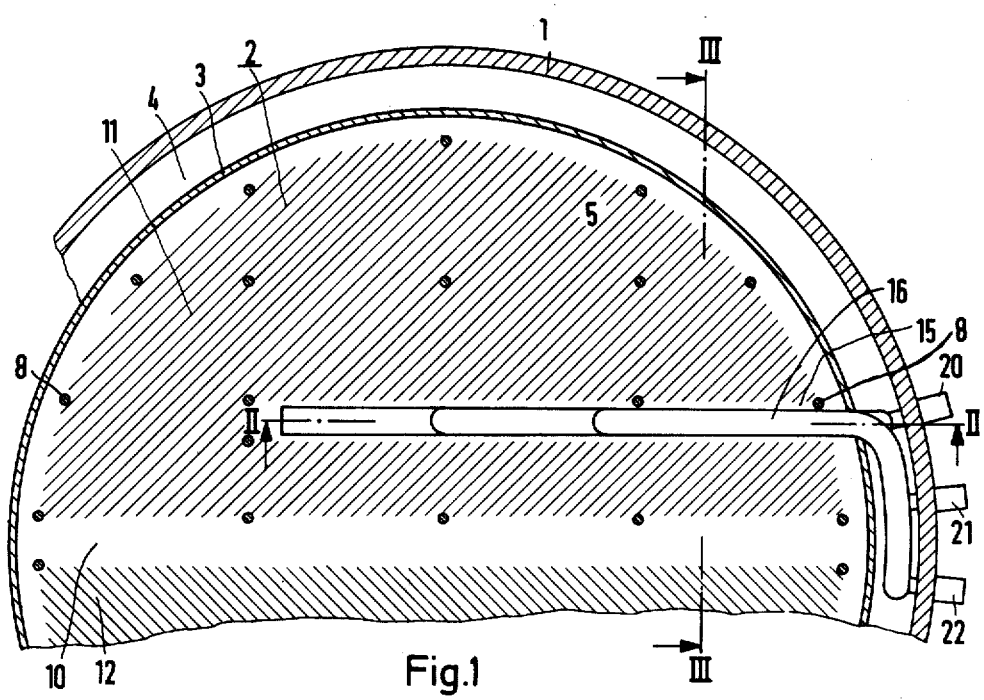
FIG. 1 is a horizontal section showing the tube bundle inlet leg portion of a steam generator and a small portion of the outlet leg side.
Figure 2:
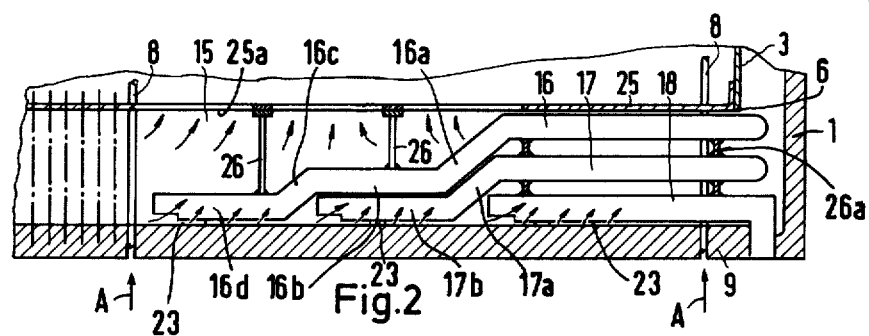
FIG. 2 is a vertical section taken on the line II—II in FIG. 1.

Referring to the above drawings, the vertical cylindrical housing of the steam generator is indicated at 1 and the inverted U-shaped bundle of tubes 2 is generally indicated by cross-hatching largely and with only a scattered showing of the interspaced tubes of the two legs of the tube bundle. The vertical cylindrical shell which peripherally encloses the tube bundle is indicated at 3 with the descent space formed between the outside of this shell and the inside of the vertical cylindrical housing 1 being shown at 4. The cross-hatched area 5 indicates the boiling space up through which the ascending feed-water rises while evaporating. The bottom edge of the shell 3 terminates at 6 as shown in FIG. 2, to provide for the descending feed-water flow to flow radially inwardly around the inlet leg tubes. In FIG. 2 only two of these tubes 8 are shown, with their bottom ends mounted in the horizontal tube sheet 9 which closes the lower end of the housing 1. Although not shown, the usual inlet manifold will be located below the bottom of this tube sheet 9 so that the pressurized-water coolant from the reactor can flow upwardly through all of the tubes of the inlet leg as indicated by the arrows A. Being a U-shaped tube bundle, a vertically extending channel or passageway 10 is inherently formed between the hot or inlet leg 11 and the cold or outlet leg 12 of the tube bundle. At the top of the tube bundle the rounded tube portions span this channel 10. In FIG. 1 the two legs are indicated by differently angled crosshatching.

The previously referred to alleyway or passageway formed by appropriately interspacing the tubes of the hot leg of the tube bundle, is indicated at 15 in FIG. 1. This extends throughout the inlet area of the inlet leg. This alleyway 15 results in the inlet leg 11 of the tube bundle being of necessity somewhat horizontally fatter than is the outlet or cold leg 12, and this is taken care of by the asymmetrical arrangement previously described. As viewed in FIG. 1, the leg 12 would be positioned a little below the horizontal center line of the tube bundle while the hot or inlet leg 11 would represent a group of vertical tubes extending substantially to this horizontal center line.

In this instance the stack of pipes comprises three pipes 16, 17 and 18, respectively having outlet connections 20, 21 and 22 extending through the housing 1 and, of course, the shell 3. The connections 20 through 22 may be connected as blowdown pipes in the prior art manner, for the purpose of the present invention i being necessary only to understand that they function as feed-water outlet connections.

The bottom pipe 18 extends horizontally with its bottom very close to the top of the tube sheet 9. The nex upper pipe 17 has a horizontal portion which is paralle to the pipe 18, a portion 17a that declines beyond the inner end of the pipe 18 and then an inward horizonta portion 17b that extends parallel to the tube sheet 9 Correspondingly, the top pipe 16 has a declining por tion 16a, a horizontal portion 16b extending paralle above the portion 17b, a second declining portion 16 and, finally, a horizontal portion 16d. The portions 17 and 16d have their bottom sides also positioned clos to and parallel with the tube sheet 9. The sides of th pipes close to and parallel with the tube sheet 9 all hav inlet openings 23 through which the feed water flow for removal via the outlet connections 20, 21 and 2; The horizontal portions of all of the pipes are paralle to each other and to the tube sheet 9 and the pipes ar stacked one on top of the other as shown in FIG. 2.

Although the bottom surfaces of the pipes immed ately above the tube sheet 9 do not contact the latte the pipes may have projections which do engage th top of the tube sheet for the purpose of accuratel spacing the pipe surfaces above the latter.

The mounting strip is shown at 25 in FIGS. 2 and : The ends of this strip are fastened to the bottom 6 ( the shell 3, the strip extends through the alleyway ( passageway 15 with its portion beyond this having th interspace tubes of the hot tube leg extending throug the strip as indicated by FIG. 2. This strip is provide with suspension rods 26 connected to the top pipe 1 of the pipe stack, the pipes 17 and 18 being intercoi nected by suspension members as shown at 26a. Thus, the entire pipe stack is rigidly supported.

Above the more critical central portion the strip is cutout or skeletonized as indicated at 25a in FIG. 2, the strip being solid above the mutually horizontal portions of all three pipes. With this construction the descending feed-water is accelerated inwardly to the critical area above which the feed-water is removed by the pipes 16 and 17. The uncut portion of the strip beyond this critical portion away from the stack of pipes is also closed in the interest of promoting the same effect. It follows that the strip 25 not only supports the stack of pipes, but also functions for equalizing the flow throughout this critical area.

An intermediate structure 28 arranged in the descent space in the area of the previously mentioned channel 10 between the tube legs, may be used to obtain a better flow through the hot leg 11 of the tube bundle.

What is claimed is:

1. A steam generator for a pressurized-water coolant nuclear reactor, said generator having a vertical housing, a horizontal tube sheet closing the lower end of said housing, a heat exchanger tube bundle having inlet and outlet legs mounted in said tube sheet with each leg formed by a plurality of closely interspaced vertical tubes, said inlet leg receiving an inlet flow of pressurized-water reactor coolant, means for feeding feed-water into said housing above said tube sheet for conversion to steam, and a vertical shell peripherally enclosing said tube bundle, said shell forming a feed-water descent space between it and said housing with said space adjacently above said tube sheet peripherally opening to the latter for radially inwardly directed feed-water flow thereover through said interspaced tubes of said legs and upward flow through the tube bundle to generate steam in said housing; wherein the improvement comprises means for removing a portion of the feed-water from adjacently above said tube sheet and between the interspaced tubes of said inlet leg.

2. The generator of claim 1 in which said feed-water removing means removes a plurality of flows of feed-water from a plurality of positions interspaced transversely over said tube sheet.

3. The generator of claim 2 in which said feed-water removing means comprises a plurality of pipes extending through said housing and which are vertically stacked one above another, the bottom pipe being horizontal with a bottom forming an inlet close to said tube sheet, the next upward pipe having a horizontal portion for the length of said bottom pipe and therebeyond deflecting downwardly to an end portion forming an inlet also close to said tube sheet and so on for the height of said stack.

4. The generator of claim 3 in which the vertical tubes of said inlet leg are interspaced to form a horizontally extending path therethrough in which said stack of pipes is positioned and providing clearance for the latter.

5. The generator of claim 3 including a strip having a solid portion positioned above said stack of pipes.

* * * * *

UNITED STATES PATENT AND TRADEMARK OFFICE
CERTIFICATE OF CORRECTION

PATENT NO. : 3 915 122
DATED : October 28, 1975
INVENTOR(S) : Heinz-Jürgen Schröder It is certified that error appears in the above-identified patent and that said Letters Patent are hereby corrected as shown below:

Column 4, lines 28 to 67 should read as follows:

--In this instance the stack of pipes comprises three pipes 16,17 and 18, respectively having outlet connections 20, 21 and 22 extending through the housing 1 and, of course, the shell 3. The connections 20 through 22 may be connected as blowdown pipes in the prior art manner, for the purpose of the present invention it being necessary only to understand that they function as feed-water outlet connections.

The bottom pipe 18 extends horizontally with its bottom very close to the top of the tube sheet 9. The next upper pipe 17 has a horizontal portion which is parallel to the pipe 18, a portion 17a that declines beyond the inner end of the pipe 18 and then an inward horizontal portion 17b that extends parallel to the tube sheet 9. Correspondingly, the top pipe 16 has a declining portion 16a, a horizontal portion 16b extending parallel above the portion 17b, a second declining portion 16c and, finally, a horizontal portion 16d. The portions 17b and 16d have their bottom sides also positioned close to and parallel with the tube sheet 9. The sides of the pipes close to and parallel with the tube sheet 9 all have inlet openings 23 through which the feed water flows for removal via the outlet connections 20, 21 and 22. The horizontal portions of all of the pipes are parallel to each other and to the tube sheet 9 and the pipes are stacked one on top of the other as shown in FIG. 2.

Although the bottom surfaces of the pipes immediately above the tube sheet 9 do not contact the latter, the pipes may have projections which do engage the top of the tube sheet for the purpose of accurately spacing the pipe surfaces above the latter.

UNITED STATES PATENT AND TRADEMARK OFFICE
CERTIFICATE OF CORRECTION

PATENT NO. : 3 915 122
DATED : October 28, 1975
INVENTOR(S) : Heinz-Jürgen Schröder Page 2 of 2

Figure 3:
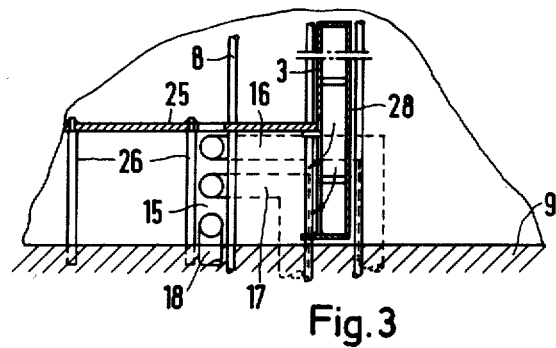
FIG. 3 is a vertical section taken on the line III—III in FIg. 1.

It is certified that error appears in the above-identified patent and that said Letters Patent are hereby corrected as shown below:

The mounting strip is shown at 25 in FIGS. 2 and 3. The ends of this strip are fastened to the bottom 6 of the shell 3, the strip extends through the alleyway or passageway 15 with its portion beyond this having the interspace tubes of the hot tube leg extending through the strip as indicated by FIG. 2. This strip is provided with suspension rods 26 connected to the top pipe 16 of the pipe stack, the pipes 17 and 18 being interconnected by suspension members as shown at 26a. Thus, the entire pipe stack is rigidly supported.--

Signed and Sealed this seventeenth Day of February 1976

[SEAL]

Attest:

RUTH C. MASON
Attesting Officer

C. MARSHALL DANN
Commissioner of Patents and Trademarks